United States Patent [19]

Smith, Sr. et al.

[11] 4,395,078
[45] * Jul. 26, 1983

[54] BEARING UNIT WITH IMPROVED INNER RACE

[75] Inventors: Harvey E. Smith, Sr., Grand Rapids; Seigfried K. Weis, Byron Center, both of Mich.

[73] Assignee: C. L. Frost & Son, Inc., Grand Rapids, Mich.

[*] Notice: The portion of the term of this patent subsequent to Apr. 6, 1999, has been disclaimed.

[21] Appl. No.: 301,871

[22] Filed: Sep. 14, 1981

Related U.S. Application Data

[63] Continuation of Ser. No. 124,556, Feb. 25, 1980, Pat. No. 4,323,288.

[51] Int. Cl.³ .............................................. F16C 19/06
[52] U.S. Cl. ................................... 308/196; 308/190; 308/236
[58] Field of Search ........... 308/196, 195, 193, 189 R, 308/190, 236, 188, 191

[56] References Cited

U.S. PATENT DOCUMENTS

| | | | |
|---|---|---|---|
| 1,093,348 | 4/1914 | Mooers . | |
| 1,200,445 | 10/1916 | Laycock . | |
| 1,617,319 | 2/1927 | Buckwalter . | |
| 1,911,336 | 5/1933 | Ackerman . | |
| 1,963,592 | 6/1934 | Pribil | 308/190 |
| 1,985,693 | 12/1934 | Robinson | 308/186 |
| 2,044,405 | 6/1936 | Schmidt | 308/198 |
| 2,076,239 | 4/1937 | Lemmon | 308/190 |
| 2,117,988 | 5/1938 | Schock et al. . | |
| 2,161,210 | 6/1939 | Waalkes | 308/190 |
| 2,614,898 | 10/1952 | Adams | 308/196 |
| 2,757,054 | 7/1956 | Van De Warker | 308/208 |
| 2,768,725 | 10/1956 | Foulds et al. | 193/37 |
| 3,250,581 | 5/1966 | Honroth | 308/191 |
| 3,537,725 | 11/1970 | Frost . | |
| 3,722,968 | 3/1973 | Bomberger | 308/191 |
| 3,807,818 | 4/1974 | Donahue et al. | 308/191 |
| 4,154,447 | 5/1979 | Francis, Jr. et al. . | |

FOREIGN PATENT DOCUMENTS

| | | |
|---|---|---|
| 104077 | of 0000 | Fed. Rep. of Germany . |
| 1288369 | of 0000 | Fed. Rep. of Germany . |
| 669436 | of 0000 | France . |
| 502354 | 5/1920 | France . |
| 225021 | of 1943 | Switzerland . |

Primary Examiner—Lenard A. Footland
Attorney, Agent, or Firm—Price, Heneveld, Huizenga & Cooper

[57] ABSTRACT

A bearing assembly especially adapted for use as a trolley wheel for overhead conveyors. The assembly includes a multipart inner race in which one annular part, preferably machined from steel, bears the major loading on the assembly and the other annular part, preferably formed from sheet metal, bears only minor loading. The major load bearing inner race part extends on either side of the root diameter of the inner raceway and allows a full complement of balls to be inserted in place between the inner and outer raceways without heating and expansion, or contraction, or any other treatment of the inner or outer race parts. The minor load bearing inner race part is preferably clamped to the major load bearing part and provides a contoured extension of the major load bearing raceway for guidance and ball retention purposes. Preferably, the outer race outer circumference is curved to accommodate a sloped support track in overhead conveyors such that the loading force is directed through the balls to the major load bearing inner race part.

10 Claims, 9 Drawing Figures

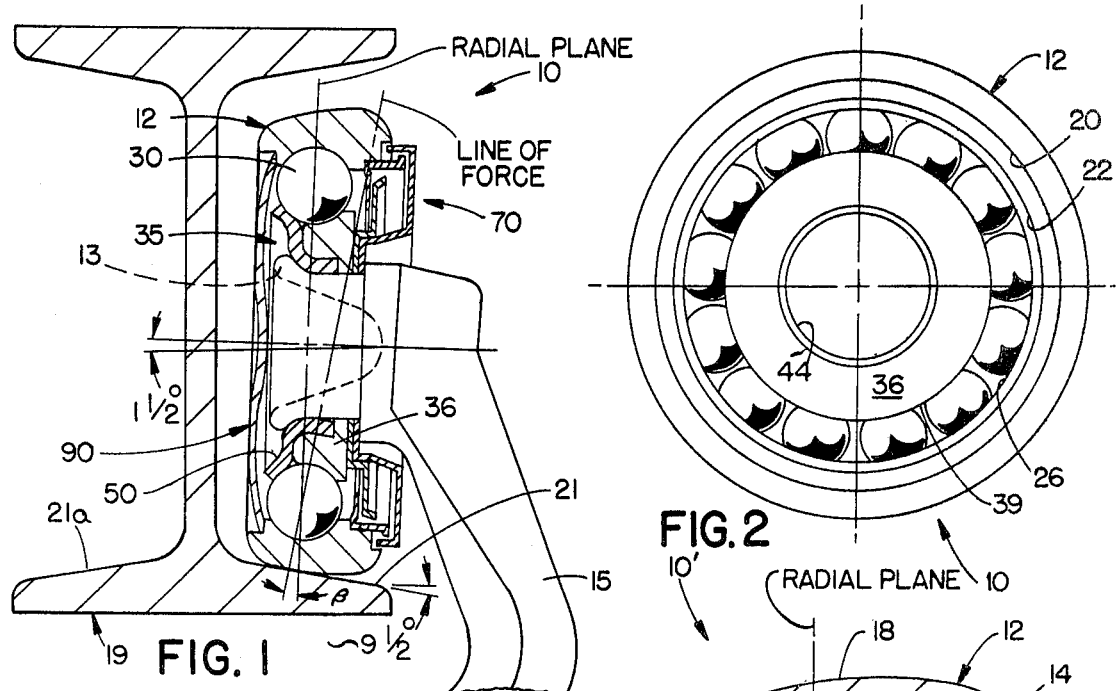
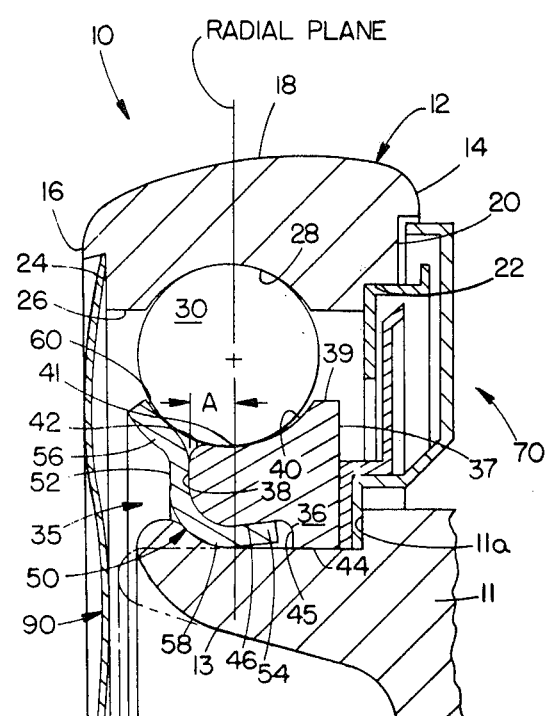
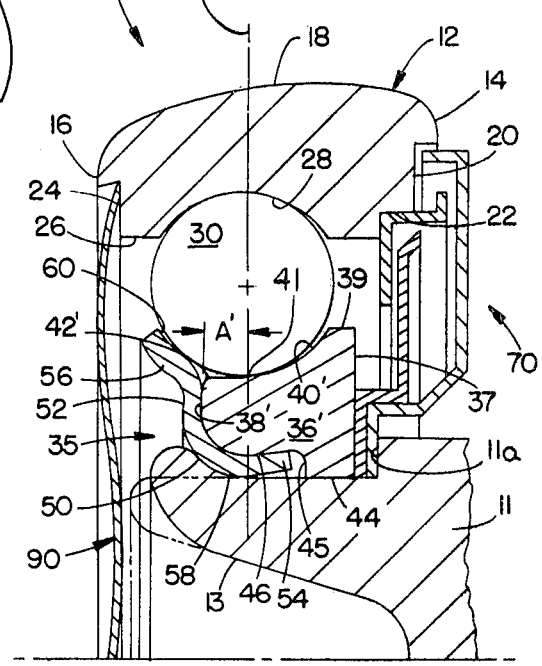
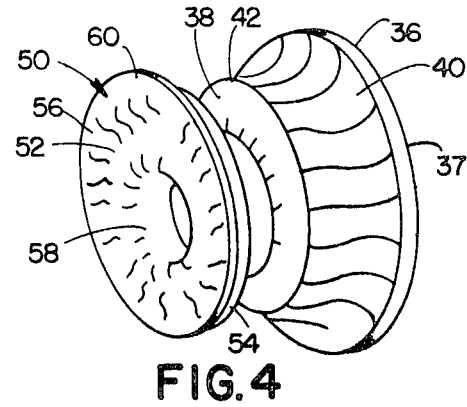

BEARING UNIT WITH IMPROVED INNER RACE

CROSS REFERENCE TO RELATED APPLICATION

This is a continuation of application Ser. No. 124,566, filed Feb. 25, 1980, now U.S. Pat. No. 4,323,288.

BACKGROUND OF THE INVENTION

This invention relates to improved bearing assemblies, and more particularly, to an improved bearing unit especially useful as a trolley wheel for overhead conveyors and an improved inner race structure for that bearing unit.

In general, two types of ball bearing assemblies are available, namely, full-ball complement and retainer-type structures. Retainer-type assemblies typically include an outer race, a single piece inner race, a lesser number of balls between the two races than in a full-ball complement assembly, and a retainer or cage at least partially enclosing the balls but not engaging either race for retaining the balls in the assembly. Retainer-type assemblies are generally used to handle lighter loads but are capable of attaining higher speeds principally due to the lesser number of balls and the resulting lower friction produced in the assembly due to the elimination of ball-to-ball contact.

In full-ball complement bearing assemblies, a series of balls is fitted between a multipart inner or outer race, or a single piece inner or outer race including a filling slot, and a single piece opposing race to enable insertion of the balls into the assembly.

One type of full-ball complement bearing assembly includes a two part inner race having two, symmetrical, machined, annular inner race parts including a curved raceway. The inner race dividing line is directly under or in line with the ball centers. The two parts are held together by a flanged hub or sleeve which is passed through both parts, expanded or riveted over at the end opposite the flanged portion. In this form each of the inner race parts essentially bears an equal load.

Another full-ball complement bearing unit is shown in French Pat. No. 502,354 and includes a two part inner race assembly where both parts appear to be fully machined and one includes a wider portion of the ball track than the other. In this unit the outer race must be heated and expanded to allow insertion of the ball members between the races.

Other types of multipart inner race bearing assemblies have a single, machined, annular inner ring and a flat washer or flat snap ring substituted for a missing raceway shoulder to retain the balls in the unit after assembly. This type assembly suffers from several drawbacks including excessive end play or axial runout which causes the bearing assembly to skew or improperly track, excessive wear on the balls due to a gap in and a lack of contour of the support surface for the balls and ball engagement with the sharp corner of the snap ring or washer in certain circumstances, and excessive stress on the balls because of the inclusion of a cylindrical or "flat" raceway portion in the raceway area which provides principal load support which is not contoured to the shape of the ball.

In order to avoid the above-noted additional processing steps for expanding the races to allow assembly, as well as the above functional problems, it has previously been necessary to utilize an inner race assembly having two machined inner race parts which provide a wide opening for ball insertion, neither of which parts provides the majority of the support and ball retention functions. Of course, such assemblies are significantly more expensive to manufacture than the present invention. The present invention is designed as a less expensive, full-ball complement trolley wheel or bearing assembly which can be assembled in its ambient state, is competitive from a price standpoint with retainer type wheels, and which, even in the partially machined preferred embodiment, includes the performance characteristics of more expensive, fully machined, full-ball complement wheels.

SUMMARY OF THE INVENTION

Accordingly, the present invention is a bearing assembly especially useful as a trolley wheel is overhead conveyors including a multipart inner race which enables use of a full complement of balls and provides the load bearing capabilities of currently known full-ball complement bearing assemblies. In addition, the assembly provides other functional advantages while requiring significantly less manufacturing time, processing and expense, thus making the wheel competitive from a price standpoint with retainer-type bearings and wheels.

Essentially, the invention uses a two-part inner race in which one inner race part, preferably machined from steel, bears a major portion of the loading on the wheel. The one inner race part has a central aperture therethrough, a raceway shoulder on one side of a radial plane extending through the centers of the ball members supported between the inner and outer race parts and the minimum or root diameter of the inner race, and a curved raceway portion extending from the shoulder to at least the minimum or root diameter at the radial plane. The first inner race part also includes an extension beyond the radial plane on the other side thereof.

In one form of the invention, the extension of the first inner race part is a second shoulder on the other side of the radial plane, the second shoulder having a diameter less than that of the shoulder on the one side of the radial plane but greater than the minimum or root inner race diameter. The second shoulder allows a full complement of ball members to be inserted between that major load bearing inner race part and a single piece outer race without expansion, contraction or other special assembly procedures on the races or balls. That second shoulder also provides some resistance to the removal of the balls after insertion.

In a second alternative form of the invention, the first inner race part extension includes an annular, cylindrical surface extending perpendicular to the radial plane and having a diameter equivalent to the inner raceway minimum diameter. Assembly of the second form of the first inner race part with ball members and the single piece outer race part is also enabled without any special processing, expansion or contraction of these parts because the cylindrical, annular surface is the same size as the minimum or root diameter of the inner raceway thereby allowing such insertion.

With either form of the first inner race part, a second inner race part, preferably stamped from sheet metal, is engaged by the first part on the other side of the radial plane on which the extension extends and has a curved shoulder forming another curved portion of the inner raceway which extends beyond the extension of the first inner race part on that other side of the radial plane to guide and retain the ball members in the inner and outer raceways. The second inner race part bears only a minor portion of the loading on the wheel or bearing unit while serving as a guide and retainer for a full complement of ball members during operation. The combined parts provide a contoured raceway resulting in minimal ball stress, low wear, and minimum end play or axial runout.

In other aspects, the major and minor raceway portions each have a radius of curvature slightly larger than that of the ball to provide optimum ball contact with the raceways preventing high ball stress. The first support is annular and is preferably machined from steel or other metal. The second support is also annular and is preferably stamped from steel or other metal, fitted to the machined part, and clamped thereto by expanding a bendable flange into a recess on the first machined part. In the preferred embodiments, the outer circumference of the outer race includes a curvature which, in cooperation with a sloped support track on which the assembly is designed to operate as a trolley wheel in an overhead conveyor, and the camber angle at which the wheel is supported on an overhead conveyor trolley bracket, causes any load imposed on the assembly to pass through the outer race, as close as possible to the center of lowermost ball and through the machined or major load bearing inner race part. This prevents undue force on the minor load bearing, stamped, inner race part.

The present invention is competitive with previously less expensive, retainer-type and other bearing and trolley wheel assemblies which do not include multipart inner race structures. The invention provides excellent load bearing capabilities, minimal ball stress, high wear resistance, minimal end play or axial runout, and proper tracking with little skew of the assembly or wheel on its track because of the closely fitted raceway contour and minimum end play. The invention is easy to assemble in its ambient condition without heating and expansion, contraction or special assembly processing of any of the inner and outer race parts or ball members because of the provision of either the low shoulder or the annular, cylindrical surface on the major load bearing inner race part followed by engagement and clamping of the stamped part to the machined part. Overall, the expense of the improved inner race of the present invention is greatly reduced from other full-ball complement trolleys or bearing assemblies because of the lesser manufacturing requirements and ease of assembly.

These and other objects, advantages, purposes and features of the invention will become more apparent from a study of the following description taken in conjunction with the drawings.

BRIEF DESCRIPTION OF THE DRAWINGS

FIG. 1 is a sectional elevation of the bearing assembly or trolley wheel of the present invention supported on an I-beam-type, overhead conveyor track and mounted on a conventional trolley bracket;

FIG. 2 is a side view of the bearing assembly or trolley wheel shown in FIG. 1 but without the support track or trolley bracket or the seal and shield structure on the outer side;

FIG. 3 is a fragmentary, sectional, enlarged elevation of the bearing assembly or trolley wheel of FIGS. 1 and 2;

FIG. 4 is an exploded, perspective view of the inner race parts of FIG. 3;

FIG. 5 is a fragmentary, sectional, enlarged elevation of a modified form of the bearing assembly or trolley wheel of FIGS. 1–4;

DESCRIPTION OF THE PREFERRED EMBODIMENTS

Figure 6:
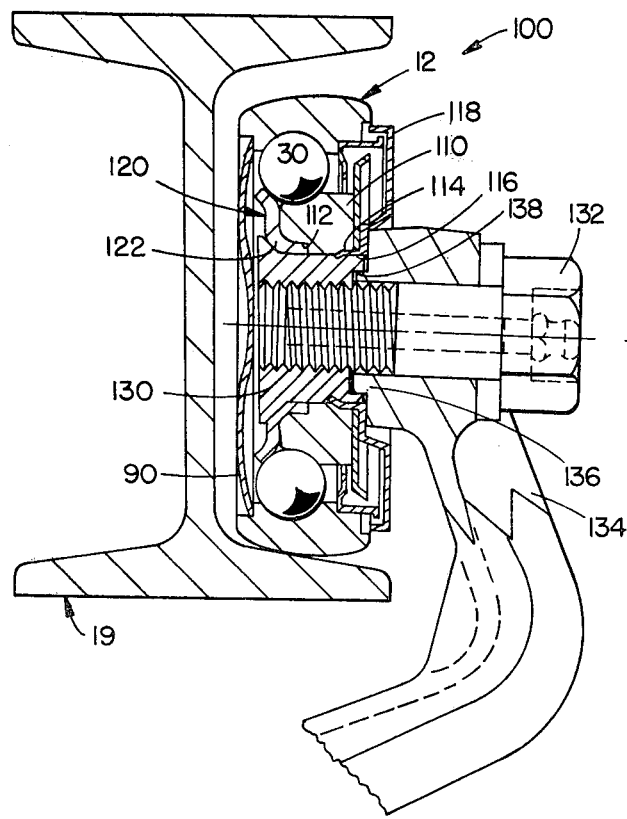
FIG. 6 is a fragmentary, sectional elevation of another modified form of the bearing assembly or trolley wheel of the present invention.

Referring now to the drawings in greater detail, FIGS. 1–3 illustrate a first form of the bearing assembly or trolley wheel unit 10 of the present invention. Wheel or bearing 10 includes an outer race 12, a plurality or full complement of balls 30, an inner race assembly 35, a sealing assembly 70 on one side, and a welch plug or full seal 90 on the opposite side. As is best seen in FIG. 1, the bearing or wheel assembly 10 is designed for attachment to the nose or extending flange 13 at the head of a trolley bracket 11 which also includes an intermediate suspended portion 15 and an overhead conveyor chain engaging portion (not shown). When secured on nose or flange 13 of bracket 11, the wheel is designed to be supported on the sloped lower flange 21 of an I-beam overhead conveyor track 19 as shown in FIG. 1. In the preferred embodiment of the invention, the slope of the flange 21, the camber angle at which the wheel or bearing assembly 10 is supported on trolley bracket 11, as well as the contour of the outer circumference of outer race 12 are taken into account to determine the line of force loading exerted on the wheel or bearing assembly during operation. As will be apparent from FIG. 1, an identical wheel and trolley bracket assembly is designed for support on the opposite, lower track flange 21a such that the chain engaging portions of two brackets (not shown) abut together and are received within the center link of an overhead conveyor chain in the conventionally known manner.

As seen in FIGS. 2 and 3, outer race 12 is annular and includes opposite side surfaces or faces 14, 16, side 14 being of a larger diameter than side 16. An arcuate or curved outer circumferential surface 18 slopes between the larger diameter 14 and the smaller diameter 16 as shown in FIG. 3. Face or side surface 14 also includes smaller diameter, axial recesses 20, 22 which extend in a stepped fashion toward a central opening or aperture 26 extending through the outer race. Similarly, in face 16, a smaller diameter recess 24 with a radially inwardly beveled edge has been provided. Recesses 20, 22 and 24 receive portions of the sealing assembly 70 and welch plug 90, respectively, as will be described hereinafter. A curved outer raceway 28 is also provided in the central aperture 26 at a position intermediate axial recesses 22, 24. Raceway 28 includes a radius of curvature slightly larger than the desired ball size to reduce friction while minimizing stress on the balls and also to provide sufficient and adequate support therefor.

The essence of the present invention lies in the inner race assembly 35, best seen in FIGS. 1, 3 and 4. Inner race assembly 35 includes two parts, namely, an annular principal inner raceway part or support 36, preferably machined from metal such as steel and case hardened to reduce wear, and an annular secondary inner race part 50 preferably stamped from sheet metal such as steel and also case hardened and/or coined on its raceway portion to reduce wear. Primary inner race part 36 includes radially extending side faces 37, 38, side face 37 having a larger diameter than face 38. A larger diameter shoulder 39 extends axially inwardly from face 37 and defines one side of a curved or arcuate raceway 40 extending from shoulder 39 through the minimum or root diameter 41 of raceway 40 to a second, or low shoulder 42 on the opposite side of the radial plane including the centers of balls 30 and root diameter 41. Raceway 40 has a radius of curvature slightly larger than the radius of curvature of balls 30 such that optimum ball contact with minimum stress buildup is provided. Low shoulder 42 has a diameter which is larger than the root or minimum diameter 41 of raceway 40 by a dimension within the range of approximately 2% to 4% of the ball diameter. Thus, in the preferred embodiment of a four-inch trolley wheel assembly, including a full complement of balls of ½-inch diameter, low shoulder 42 extends above or beyond the minimum or root diameter 41 by the dimension within the range of approximately 0.010 to 0.020 inches. Further, in the preferred embodiment, wherein ½-inch diameter balls are used, the dimension A (FIG. 3) which is the distance side surface or face 38 of primary inner race member 36 extends beyond the radial plane including the centers of balls 30 and the minimum root diameter 41, is equal to 0.084 inches or 16.8% of the ball diameter. Preferably, dimension A is held to a range of approximately 15% to 17% of the ball diameter.

Primary inner race member or support 36 also includes a central aperture 44 extending therethrough in which is formed an annular recess 45 having a radially inwardly sloped, annular surface 46 extending outwardly to the side surface or face 38 as shown in FIG. 3. Sloped surface 46 has its minimum diameter immediately adjacent side surface 38 and is adapted to receive a bent or expanded flange from the secondary inner race part 50 as will be explained hereinafter.

Secondary inner race part 50 includes a radially extending intermediate portion 52, an annular, inwardly extending flange 54, and a curved, outwardly angled extending shoulder 56 best seen in FIG. 3. The inside surface of intermediate portion 52 abuts and engages the radially extending side surface or face 38 of primary inner race member 36 and, in the preferred embodiment, is held in that position by the bending or expansion of flange 54 into and against the sloped surface 46 in recess 45. When bent, the smallest diameter of flange 54 defines an aperture extending centrally through the secondary inner race part 50, which diameter is no smaller than the diameter of central aperture 44 in primary inner race part 36. Shoulder 56 curves outwardly and away from primary inner race part 36 to define a secondary raceway portion 60 which also has the same radius of curvature as raceway portion 40 which is slightly larger than that of the balls 30. Raceway 60 is aligned with raceway portion 40, although not continuous therewith, to provide guidance for the balls as they roll in the primary raceway 40 and, with low shoulder 42, also serves to retain the balls in the primary raceway 40. However, shoulder 56 and raceway 60 are not designed to bear a major part of the loading on the assembly. The major loading is borne by primary inner race part 36 and raceway 40. Hence, manufacture of secondary inner race part 50 from sheet metal is fully sufficient and strong enough for operation of the assembly 10 which can provide load bearing capabilities fully consistent with conventionally known full-ball complement trolley wheel or bearing assemblies having inner race structures of a fully machined or different design.

FIG. 5 shows a modified form 10' of the bearing assembly or trolley wheel of FIGS. 1-4 wherein like numerals illustrate like parts to FIGS. 1-4. The primary difference between embodiments 10 and 10' is the inclusion of a cylindrical, annular extension 42' on inner race member 36' on the side of the radial plane on which the second or minor inner race part 50 extends. Thus, embodiment 10' includes shoulder 39 and a curved, contoured raceway 40' having a curvature slightly larger than that of the ball members 30. Raceway portion 40' extends from shoulder 39 to the minimum or root diameter 41 at the radial plane. Beyond the radial plane, cylindrical surface 42' extends laterally to side surface or face 38' of the primary inner race member 36'. The diameter of the cylindrical extension surface 42' is that of the minimum or root diameter of the inner raceway. In this form, the secondary inner race part 50 is the same as that in embodiment 10 and engages extending side surface or face 38' and extends radially and axially outwardly of cylindrical surface 42' in a curved fashion with curved surface 60 to form an extension of the curved, contoured raceway 40' in the same fashion as in embodiment 10. The dimension A' (FIG. 5) is preferably held within the same range 15% to 17% of the ball diameter as in embodiment 10.

Embodiment 10' provides the advantage of even easier insertion of ball members 30 between inner race part 36' and outer race part 12 because there is no low shoulder over which the ball members are inserted. The costs for embodiment 10' are reduced as compared to bearing 10 because it is easier to manufacture and assemble. As in embodiment 10, the sloped or contoured outer race circumference 18 in combination with the sloped track 21 causes the major load on the bearing assembly to be borne by inner race part 36', and more specifically, the contoured, curved race portion 40' of that inner race part. Secondary inner race part 50 provides only a minor low bearing support and principally provides guidance and retention for the ball members 30. The annular, cylindrical surface 42' is not engaged by the ball members during their movement because of the retention and guidance of the secondary inner race part 50. Hence, stress buildup is also prevented in embodiment 10' because the cylindrical portion does not bear any significant loading and because ball members 30 are engaged by a curved, contoured raceway including portions 40' and 60.

As will be understood from FIGS. 1, 3 and 5, assembly of either bearing or trolley wheel units 10 or 10' is as follows. Primary inner race part 36 or 36' is centered within outer race 12 in a suitable support and a full complement of balls 30 are inserted into position between outer raceway 28 and primary raceway 40 or 40' over the low shoulder 42 or cylindrical surface 42'. In the preferred embodiment of a 4-inch trolley wheel, 13½-inch diameter balls are so located. The dimension of low shoulder 42 described above is sufficient to assist in retaining the balls in place during assembly and to help do so during operation but is small enough to allow the above insertion to occur. No size modification of the outer race, inner race parts 36, 36' or 50, or ball members 30 is necessary to allow such assembly. Assembly occurs at ambient, room temperature conditions with no heating or other expansion processes, or contraction or any other special assembly processing being necessary. During operation, low shoulder 42 helps retain the balls in the primary raceway 40 with the help of shoulder 56 and raceway extension 60 on secondary inner race part 50 as described above.

After the assembly of the balls between the inner and outer raceways, secondary inner race part 50 is positioned within recess 45 of primary inner race part 36 or 36' and flange 54 is expanded or bent with an appropriate tool into that recess and against the sloped surface 46 to retain the primary and secondary inner race parts together as described above. Thereafter, the nose or extending flange 13 of a trolley bracket 11 may be inserted through central apertures 44 and 58 of the inner race parts and bent or expanded outwardly as shown in FIG. 3. Such expansion or clamping positively retains inner race parts 50 and 36 or 36' together.

If desired, sealing members forming the sealing assembly 70 may be telescoped over the extending flange or nose 13 of bracket 11 and against abutting shoulder 11a prior to insertion of that nose or flange to the inner race members described above. When flange 13 is bent or crimped against inner race assembly 50, the sealing members will be clamped against the outer side surface 37 of primary inner race part 36 and retained in sealing position as shown in FIGS. 3 and 5. The sealing assembly 70 is of the type described and claimed in U.S. Pat. No. 3,537,725, assigned to the same assignee as is the present invention, the disclosure of which is hereby incorporated by reference. Assembly of wheel or bearing units 10 or 10' to the trolley bracket 11 is completed by insertion of welch plug or full seal 90 in recess 24 as shown in FIGS. 1, 3 and 5.

Figure 7:
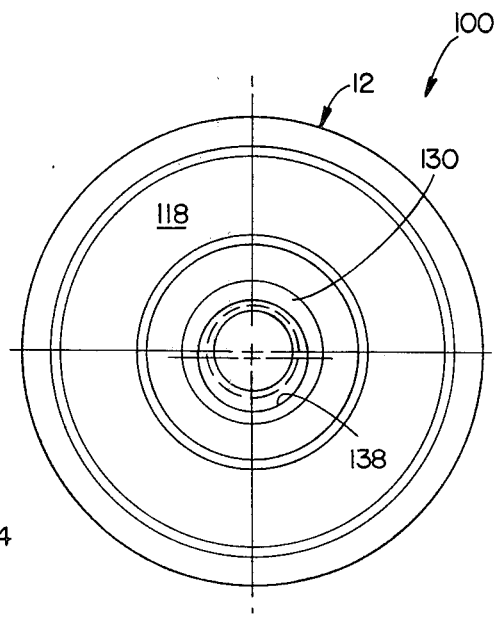
FIG. 7 is a side elevation of the bearing assembly or trolley wheel of FIG. 6 without the support track or trolley bracket shown in FIG. 6.

Referring now to FIGS. 6 and 7, a second embodiment 100 of the bearing unit or trolley wheel assembly of the present invention is illustrated wherein like numbers indicate like parts to those in embodiment 10. Embodiment 100 differs principally from embodiment 10 by the inclusion of slightly modified primary and secondary inner race parts 110 and 120. Primary inner race part 110 is the same as part 36 except that recess 112 for receiving the flange 122 of inner race part 120 is not sloped and extends parallel to the axis of the wheel assembly. Secondary inner race part 120, which is otherwise exactly the same as inner race part 50, includes flange 122 which also extends parallel to the axis and is either slip-fitted or press-fitted into recess 112. Part 120 is retained in engagement with primary inner race part 110 by means fo a flanged central hub 130 having a threaded central bore receiving a fastening bolt or stud 132 through the apertured head of a trolley bracket 134 as shown in FIG. 6.

For shipment and operation purposes, the outermost seal 118 in the sealing assembly included in embodiment 100 includes an inwardly extending flange 116 designed to be received in and bent into cooperating recesses 114 radially opposed with one another on the outer circumference of hub 130 and the inside diameter of primary inner race part 110. Flange 116 therefore retains the hub 130 within the inner race parts 110, 120 as is described and claimed in copending U.S. patent application Ser. No. 57,588, filed July 16, 1979, and assigned to the same assignee as the present invention, the disclosure of which is hereby incorporated by reference. As is explained in application Ser. No. 57,588, the head of trolley bracket 134 includes an eccentrically located projection 136 which is cylindrical but offset from the axis of bolt 132 and hub 130 for receipt in the correspondingly offset circular recess 138 in the outer end of hub 130 thereby preventing rotation between hub 130 and bracket 134. In turn, flange 116 prevents rotation between inner race parts 110 and 120 with respect to hub 130 and bracket 134 in the manner described in application Ser. No. 57,588. Operation and load bearing capabilities of embodiment 100 are equivalent to those of embodiment 10.

Figure 8:
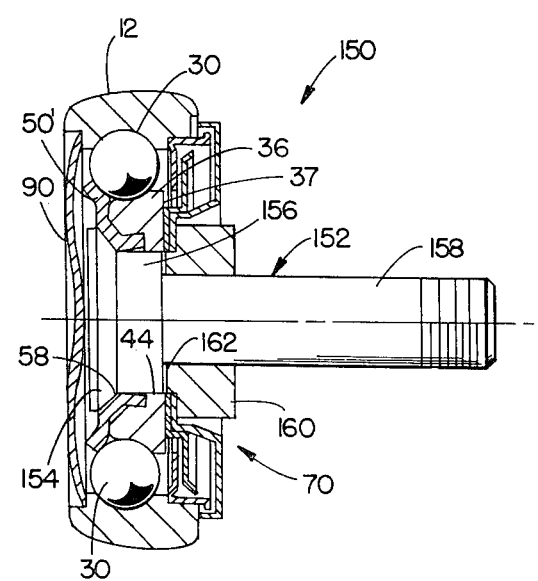
FIG. 8 is a fragmentary, sectional elevation of a fourth form of the bearing assembly or trolley wheel of the present invention.
Figure 9:
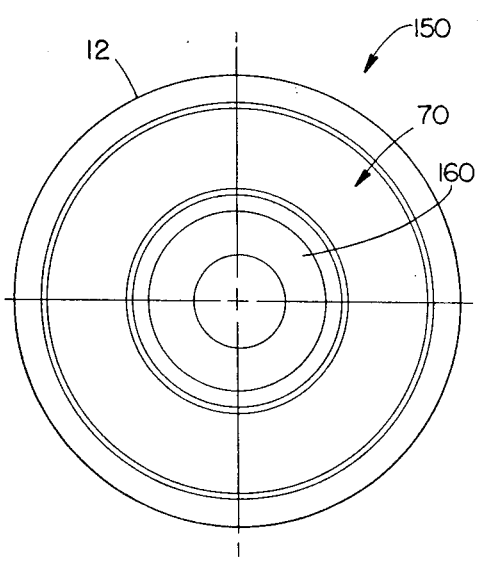
FIG. 9 is a side elevation of the trolley wheel of FIG. 8.

Referring now to FIGS. 8 and 9, a third embodiment 150 of the bearing assembly or trolley wheel unit is shown wherein like numbers illustrate like parts to those included in embodiment 10. The essential difference between embodiment 150 and embodiment 10 is the inclusion of a different type of fastening stud received through the central apertures 44, 58 of primary and secondary inner race parts 36 and 50'. Stud 152 also includes a head or flange 154 having an interior bevel or chamfer received against a correspondingly beveled exterior of secondary inner race part 50' to hold that part against the primary inner race part. Other than such bevel, part 50' is the same as part 50. Stud 152 also includes an intermediate diameter portion 156 engaging the central apertures 44, 58 and a reduced diameter fastening portion 158 designed to be received through the head of a trolley bracket such as that at 134 in FIG. 6. A retaining collar 160, having a cylindrical protrusion 162 of the same diameter as intermediate shaft or stud portion 156, is telescoped over fastening stud portion 158 against the intermediate diameter portion. Collar 160 is designed to abut against the outer surface of a trolley bracket head and to secure the sealing members of sealing assembly 70 against the exterior side 37 of primary inner race part 36 as shown in FIG. 8. Accordingly, head 154 on stud 152 and collar 160 serves to positively retain primary and secondary inner race parts 36, 50' together and sealing members of assembly 70 thereagainst when the stud and wheel assembly is secured to the head of a trolley bracket.

As will now be understood, any of the embodiments 10, 10', 100 or 150 is uniquely designed to assure that the loading on the bearing assembly or trolley wheel passes through and is primarily borne by the primary inner race part 36, 36' or 110 such that the secondary inner race parts 50, 50' or 120 provide only a guidance and retention function and bear only a minor portion of the loading on the assembly. In this connection, the line of force shown in FIG. 1 which represents the direction of the loading in the preferred embodiment, begins at an annular line around the outer race outer circumference on the inner side of the radial plane through the ball centers and inner raceway root diameter, at which that circumference engages the sloped support track surface, through or as close as possible to the center of the lowermost ball 30 on the lower side of the wheel, and through the primary inner race parts 36, 36' or 110. As such, the principal load on the wheel assembly is borne by the part 36, 36' or 110. The line of force extends at angle Beta as shown in FIG. 1. Such loading creates a minimal force moment on the bearing such that the upper balls, located approximately 180° from the loaded ball zone, ride against the secondary inner race part 50 with very little force.

In the preferred embodiments, this line of force directed through the primary inner race parts 36, 36', or 110 is determined by several factors including the draft angle of surfaces 21 or 21a on I-beam 19 which, in the preferred embodiment, for a 4-inch I-beam, ASTM-A36, is slightly less than 9½°. The line of force loading also depends on the curvature of the outer circumference of outer race 12 which in the preferred embodiment, has a radius of curvature of 3 inches for a 4-inch trolley wheel. Finally, the line of force direction also depends on the angle of camber at which the trolley wheel is supported on the trolley bracket, i.e., in the preferred embodiment 1½° from the horizontal as shown in FIG. 1. With the above dimensions, the preferred embodiment of a 4-inch trolley wheel in accordance with the present invention has been found to have the line of force pass 0.007 inches from the center of the lower ball and to its right as shown in FIG. 1. Optimally, this line of force would pass through the center of the ball but dimensional tolerances in manufacturing may cause the line of force to be slightly off center. The line of force has been found to be acceptable if it is within a range of plus or minus 0.020 inches from the center of the lower ball, i.e., plus or minus 4% of the ball diameter which is ½-inch in the preferred 4-inch trolley embodiment.

Accordingly, the present invention provides the ability for ease of assembly of a full complement of ball bearings between the inner and outer races over the low shoulder 42 followed by secure attachment of the guide and retainer secondary inner race part to the primary inner race part. The two inner race parts provide a closely controlled, curved inner raceway which keeps axial runout or end play to a minimum allowing the wheel to track properly with little skew on the support track. In addition, expense in manufacture is greatly reduced because the secondary inner race part can be stamped and mass produced and machining is only required for one of the inner race parts. That machined inner race part bears the primary load in the assembly providing long life. Even greater life and less wear are expected when one or both inner race parts are case hardened and/or coined. The inner race parts in accordance with the invention are also susceptible of being fastened to supporting brackets or trolley brackets in various ways as shown above and can accept and include various sealing structures as described.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

The embodiments of the invention in which an exclusive property or privilege is claimed are defined as follows:

1. In a bearing assembly having inner and outer race means for supporting a plurality of anti-friction ball members therebetween, and a plurality of such balls positioned between inner and outer raceways on said race means, the improvement comprising:
    said inner race means having first support means including a major portion of said inner raceway for supporting the primary portion of any load on said assembly and second support means engaged with said first support means and including a minor portion of said inner raceway for retaining and guiding said ball members and supporting a minor portion of any load on said assembly;
    said major raceway portion on said first support means extending on both sides of a radial plane of said assembly which passes through the center line of said ball members and the root diameter of said inner raceway;
    said first support means including a first shoulder having a diameter slightly larger than said root diameter of said inner raceway to allow insertion of said ball members between said inner and outer raceways prior to assembly of said second support means without heating or otherwise resizing or modifying any part of said inner or outer race means or ball members during assembly, said first shoulder also providing resistance to removal of said ball members after insertion;
    said first support means also having a generally radially extending surface adjacent said first shoulder and a recess;
    said second support means including a portion engaging said generally radially extending surface of said first support means and a flange bent into and engaging said recess to retain said inner race members in engagement.

2. The bearing assembly of claim 1 wherein said major and minor raceway portions on said first and second support means each have a radius of curvature slightly larger than that of said ball members.

3. The bearing assembly of claim 2 wherein the radius of curvature for each of said major and minor raceway portions is equivalent.

4. The bearing assembly of claim 1 wherein said ball members each have an equivalent diameter; said first shoulder diameter being larger than said root diameter of said inner raceway by a distance within the range of approximately 2% to 4% of said diameter of said ball members.

5. The bearing assembly of claim 1 wherein said first support means is a first, annular, inner race part also including a second shoulder with a diameter larger than said first shoulder, said second shoulder defining the opposite end of said major raceway portion, and a pair of spaced, radially extending, side surfaces; said second support means being a second annular, inner race part and including a radially extending portion abutting one side surface of said first inner race part and an extending shoulder larger than said first shoulder on said first inner race part, said extending shoulder including said minor raceway portion.

6. In a bearing assembly of the type having a plurality of anti-friction balls; outer race means having an outer raceway for supporting said plurality of balls; and inner race means spaced radially inwardly of said outer race means and having an inner raceway in opposition to said outer raceway for supporting said plurality of balls, the improvement comprising:
    said inner race means having a minimum or root diameter;
    said bearing assembly including a radial plane passing through said outer race means, the centers of said balls, and said root diameter of said inner race means;
    said inner race means including a first annular inner race member having a first raceway extending from a first shoulder having a first diameter on one side of said radial plane to a second shoulder on the opposite side of said radial plane, said second shoulder having a second diameter less than said first diameter and slightly larger than said root diameter, a generally radially extending surface adjacent said second shoulder, and a recess, and a second annular inner race member having a portion engaging said generally radially extending surface of said first inner race member and having a second raceway forming an extension of said first raceway and extending to a third shoulder of a diameter larger than said second diameter;

said second shoulder having a diameter sufficient to allow said plurality of balls to be inserted into position intermediate said inner and outer raceways without heating or otherwise resizing or modifying of any part of said inner or outer race means or anti-friction balls during assembly, and to resist removal of said balls once in position whereby said first inner race part provides principal load bearing support for said outer race means and balls while said second inner race part provides ball retention and guidance and lesser load bearing support than said first inner race part;

said second inner race part also having a flange bent into and engaging said recess to retain said inner race members in engagement.

7. The bearing assembly of claim 6 wherein said balls each have an equivalent predetermined diameter; said second diameter being larger than said root diameter by a distance within the range of approximately 2% to 4% of said predetermined ball diameter.

8. The bearing assembly of claim 6 wherein said first inner race part is machined from metal; said second inner race part being stamped from sheet metal.

9. The bearing assembly of claim 8 wherein at least one of said first and second inner race parts is hardened.

10. The bearing assembly of claim 6 wherein said inner raceway formed by said first and second inner race members has a radius of curvature slightly larger than that of said balls.

* * * * *